United States Patent [19]

Paxson

[11] Patent Number: 5,267,432
[45] Date of Patent: Dec. 7, 1993

[54] SYSTEM AND METHOD FOR CANCELLING EXPANSION WAVES IN A WAVE ROTOR

[75] Inventor: Daniel E. Paxson, Parma Heights, Ohio

[73] Assignee: The United States of America as represented by the Administrator of the National Aeronautics & Space Administration, Washington, D.C.

[21] Appl. No.: 889,003

[22] Filed: May 26, 1992

[51] Int. Cl.$^5$ .............................................. F02C 3/02
[52] U.S. Cl. ...................................... 60/39.45; 417/64
[58] Field of Search ...................... 60/39.45 A; 417/64

[56]         References Cited

U.S. PATENT DOCUMENTS

| | | | |
|---|---|---|---|
| 1,180,613 | 4/1916 | Siemen | 417/68 |
| 2,852,915 | 9/1958 | Jendrassik | 60/39.45 A |
| 2,867,981 | 1/1959 | Berchtold | 60/39.45 A |
| 3,082,934 | 3/1963 | Spalding | 60/39.45 A |
| 3,164,318 | 1/1965 | Barnes et al. | 417/64 |
| 4,123,200 | 10/1978 | Horler | 417/64 |
| 4,719,746 | 1/1988 | Keller | 60/39.45 A |
| 4,796,595 | 1/1989 | El-Nashar et al. | 417/64 |

FOREIGN PATENT DOCUMENTS

| | | | |
|---|---|---|---|
| 0980254 | 5/1951 | France | 417/64 |
| 2033014 | 5/1980 | United Kingdom | 60/39.45 A |

OTHER PUBLICATIONS

R. D. Pearson, A Gas Wave-Turbine Engine Which Developed 35 11.P. and Performed Over a 6:1 Speed Range, Mar. 1985, pp. 125-170, University of Bath, U.K.

George Gyarmathy, How Does The Comprex Pressure-Wave Supercharger Work?, pp. 81-101, BBC Brown, Boveri & Co., Ltd. Baden, Switzerland, Society of Automotive Engineers, SAE 830234, Mar. 4, 1983.

Tony A. Kollbrunner, Comprex Supercharging for Passenger Diesel Car Engines, 1980, BBC Brown, Boveri & Co., Ltd., Switzerland, Society of Automatic Engineers, SAE80084, Aug. 11-14, 1980.

Primary Examiner—Richard A. Bertsch
Assistant Examiner—Michael I. Kocharov
Attorney, Agent, or Firm—Gene E. Shook; Guy M. Miller; James A. Mackin

[57]         ABSTRACT

A wave rotor system includes a wave rotor coupled to first and second end plates. Special ports are provided, one in each of the first and second end plates, to cancel expansion waves generated by the release of working fluid from the wave rotor. One of the expansion waves is reflected in the wave rotor from a reflecting portion, and provided to the special port in the second end plate. Fluid present at the special port in the second end plate has a stagnation pressure and mass flow which is substantially the same as that of the cells of the wave rotor communicating with such special port. This allows for cancellation of the expansion wave generated by the release of working fluid from the wave rotor. The special port in the second end plate has a first end corresponding substantially to the head of the expansion wave, and a second end corresponding substantially to the tail of the expansion wave. Also, the special port is configured to continually change along the circumference of the second end plate to affect expansion wave cancellation. An expansion wave generated by a second release of working fluid from the wave rotor is cancelled in a similar manner to that described above using a special port in the first end plate. Preferably the cycle of operation of the wave rotor system is designed so that the stagnation pressure and mass flow of the fluid present at the special ports is the same so that the special ports may be connected by a common duct.

9 Claims, 3 Drawing Sheets

SYSTEM AND METHOD FOR CANCELLING EXPANSION WAVES IN A WAVE ROTOR

ORIGIN OF THE INVENTION

The invention described herein was made by an employee of the U.S. Government and may be manufactured and used by or for the Government for governmental purposes without the payment of any royalties thereon or therefore.

BACKGROUND OF THE INVENTION

1. Field of the Invention

The present invention relates generally to a system and method for cancelling expansion waves in a wave rotor, or more specifically, to a system and method for cancelling expansion waves generated by the release of working fluid from the wave rotor using special ports.

2. Description of the Related Art

The wave rotor concept has existed since at least the 1940,s. Presently, the exploitation of the advantages provided by wave rotors has been minimal. It is believed that only one company, Brown Bovari, has developed a wave rotor successfully, such wave rotor being used as a super charger for an automobile engine.

A considerable amount of gas turbine research is focused currently on improving the efficiency of aircraft turbofan engines. One way to achieve high efficiency is by significantly raising the compressor pressure ratio (compressor exit pressure divided by inlet pressure), and/or the temperature in the burner of the aircraft turbofan engine above the values presently used. However, several constraints presently inhibit the realization of aircraft turbofan engines with significantly-raised compressor pressure ratios or temperatures. Raising the pressure ratio and, therefore, an associated gas density, requires the use of very small passages and blading in the turbofan engine. However, the increased surface area resulting from the use of very small passages and blading, causes a decrease in component efficiency through friction losses. Hence, the theoretical improvement in cycle efficiency achieved by raising the compressor pressure ratio is more than negated by the decrease in component efficiency.

On the other hand, significantly increasing the temperature of the working fluid used in a turbine is limited by the temperatures which the materials in the turbine can withstand. Presently, it is doubtful that present cooling techniques and materials would be adequate to accommodate significantly increased temperatures in an aircraft turbofan engine.

One proposed concept which may have the potential to overcome one or possibly both of these problems is the wave rotor. Contemplation of wave rotors for use as high-pressure gas turbine cores is a relatively recent development, and it is believed that no such wave rotor has ever been successfully developed. Generally, the wave rotor functions like conventional gas turbines to compress, heat and expand a working fluid to extract useful work. In a wave rotor, however, unlike a conventional gas turbine, the working fluid gains or loses energy by using unsteady, one dimensional waves instead of by using conventional rotating airfoils. This characteristic of the wave rotor reduces the problem of small blading losses present in conventional core engines. Further, the wave rotor has the distinct advantage of effectively concentrating both a compressor and a turbine in one device.

FIG. 1 is a simplified drawing of a wave rotor. The wave rotor includes a series of cells in an annular ring which rotate about an axis parallel to the cells. As the cells rotate, the ends of each of the cells are periodically exposed to various ports which create traveling compression or expansion waves due to the different states of the working fluid present in such cells relative to the state of the working fluid present outside such cells.

One requirement for successful operation of the wave rotor is to place the ports such that after opening and creating a compression or expansion wave, such ports close before any reflected waves or waves from other port openings arrive. Thus, from the perspective of the ports, working fluid flowing into or out of the wave rotor is completely steady so that the waves appear to be stationary. From the perspective of an individual cell, however, the waves are dynamic. This is illustrated by the solid lines of FIG. 1 which represent wavefronts which separate the various flow regions.

The other important aspect of successful operation of the wave rotor is that the journey of a cell through one revolution of the wave rotor must be periodic. That is, the state of the working fluid in the cell must be the same at the end of a revolution as at the beginning. Such requirements present a fundamental challenge in the design of wave rotors.

To meet these requirements, a wave rotor must account for expansion waves generated in the wave rotor by release of working fluid from the wave rotor. One known device which effects expansion wave cancellation is disclosed in U.S. Pat. No. 3,082,934 to D. B. Spalding (hereinafter "the Spalding device") issued Mar. 26, 1963, which is incorporated herein by reference. The Spalding device uses plural subsidiary ports arranged along the head and tail of an expansion wave generated by the release of working fluid through a port. While the Spalding device is believed to effect cancellation of the expansion wave, it would be desirable to provide a wave rotor which avoids the complication presented by the provision of such plural subsidiary ports and associated ducting.

SUMMARY OF THE INVENTION

It is an object of the present invention to provide a system and method for cancelling expansion waves generated by the release of working fluid from a wave rotor.

Another object of the present invention is to provide a system and method for cancelling expansion waves generated by the release of working fluid from a wave rotor in an aircraft turbofan engine.

Another object of the present invention is to provide a system and method for reducing the average temperature to which a wave rotor is exposed.

Another object of the present invention is to provide increased efficiency in an aircraft turbofan engine relative to efficiencies obtained with present aircraft turbofan engines.

In order to achieve the foregoing and other objects, in accordance with the purposes of the present invention as described herein, a wave rotor is provided with two special ports for cancelling expansion waves generated by the release of working fluid from the wave rotor. Upon reflection within the wave rotor, one expansion wave is cancelled by a special port which has a first end corresponding to the head of the expansion wave, and a second end corresponding to the tail of the expansion wave. The special port also has a height which varies along a direction of rotation of the wave rotor, or, in other words, along the circumference of the wave rotor. A fluid of equal stagnation pressure to that of the working fluid continually varying within a cell presented at the special port, cancels the expansion wave. A second expansion wave is cancelled using a port of similar configuration and function to the special port described above. Furthermore, the special ports of the wave rotor in accordance with the present invention may be arranged so that the stagnation pressure needed to cancel the expansion wave presented at one special port is the same as the stagnation pressure needed to cancel the expansion wave at the other special port. Accordingly, the first and second ports may be connected by a common duct.

These and other features and advantages of the present invention will become more apparent with reference to the following detailed description and drawings. However, the drawings and description are merely illustrative in nature and not restrictive.

BRIEF DESCRIPTION OF THE DRAWINGS

The accompanying drawings illustrate various aspects of the present invention, and together with the description serve to explain the principles of the present invention. In the drawings.

DETAILED DESCRIPTION OF THE PREFERRED EMBODIMENTS

Figure 1:
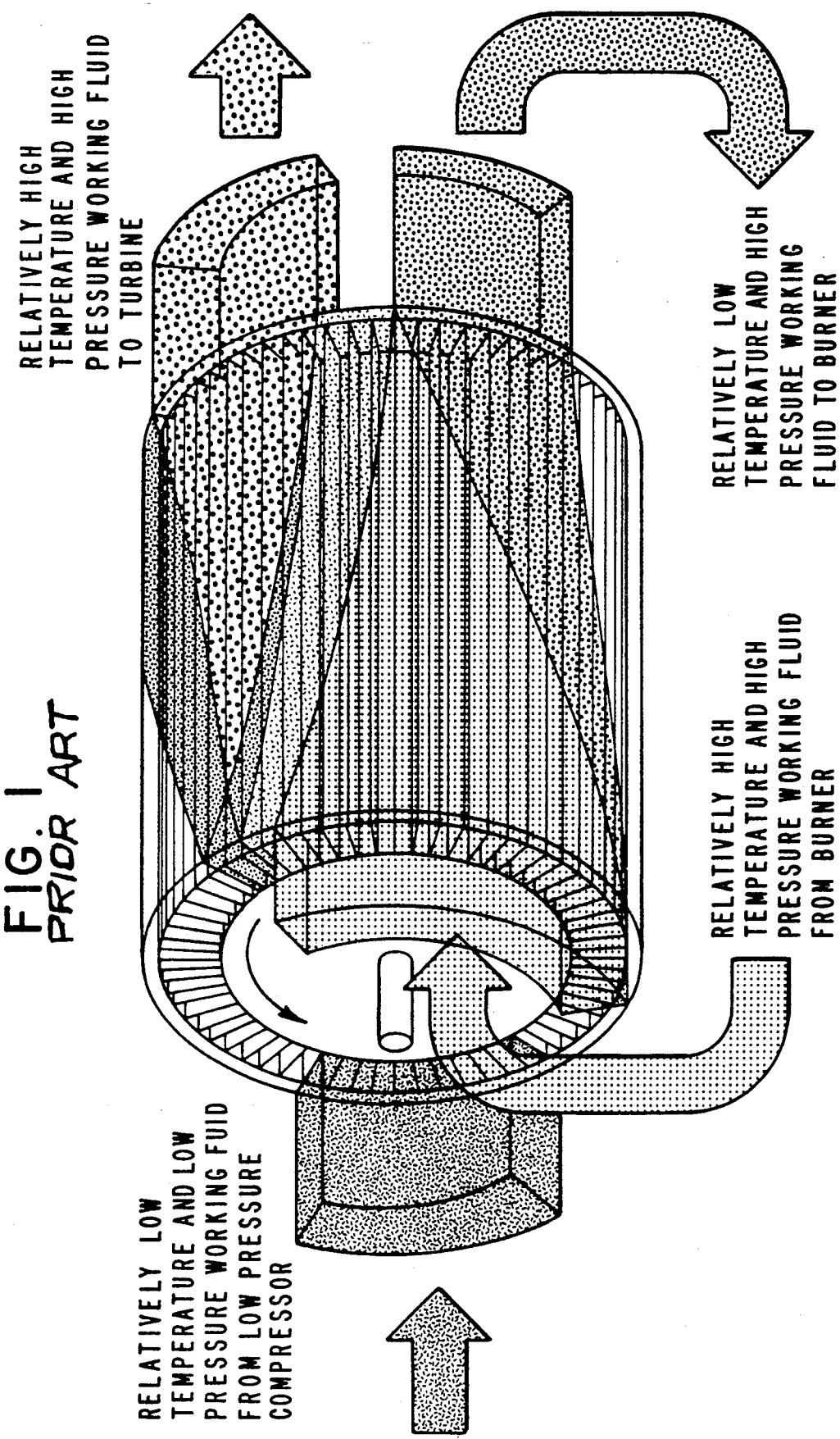
FIG. 1 is a schematic diagram of a wave rotor.
Figure 2:
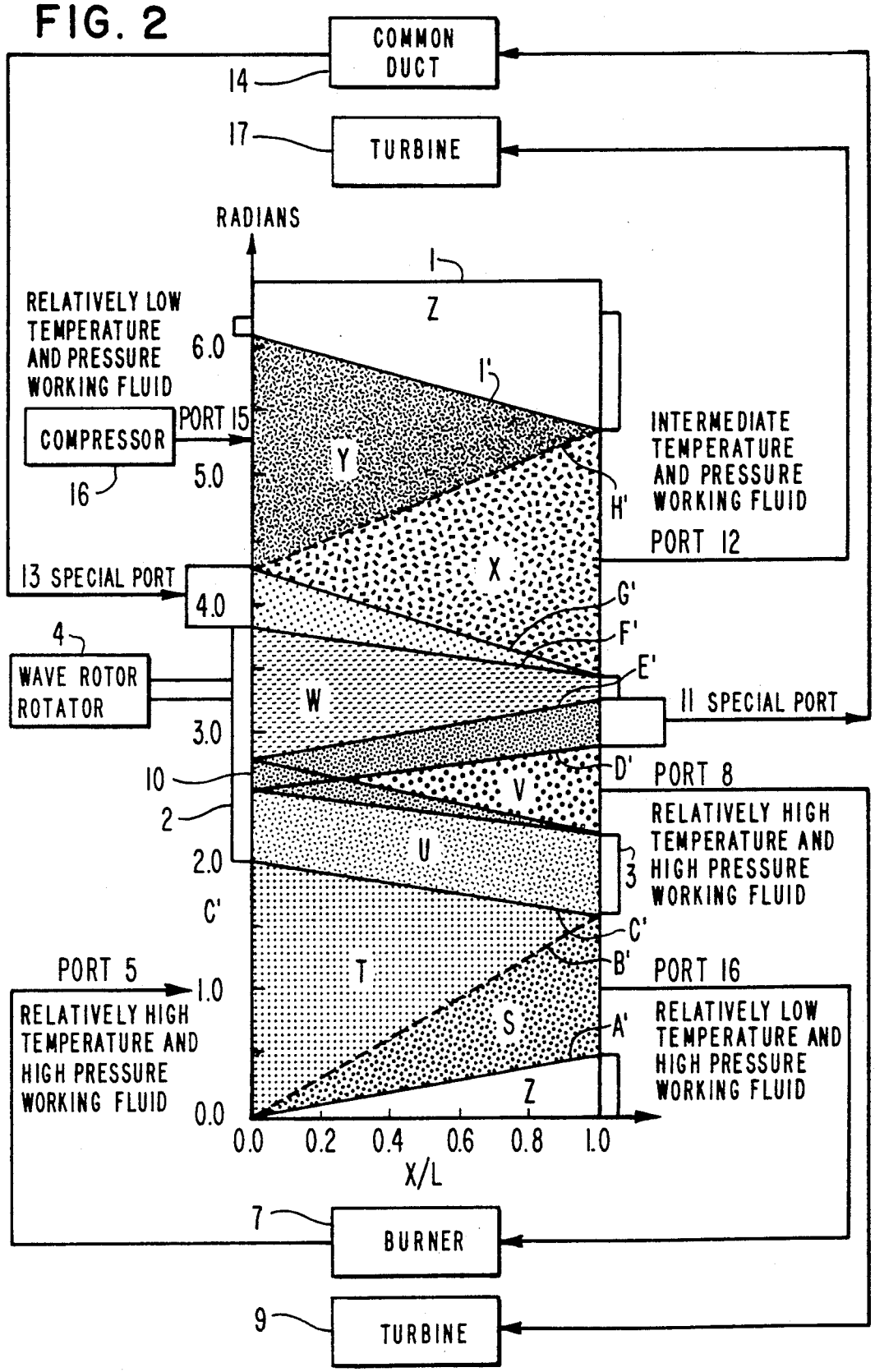
FIG. 2 is a schematic diagram of the states of the working fluid in the cells of the wave rotor in accordance with the systems and methods of the present invention.

Referring to FIG. 2, a wave rotor 1 of the present invention has been unrolled from its annulus to illustrate the states of the working fluid in a cell as it moves about the circumference of the wave rotor 1.

The wave rotor 1 is associated with end plates 2 and 3 on the left and right sides in FIG. 2. Each of the end plates 2 and 3 have various ports formed therein. The wave rotor 1 is moved relative to the end plates 2 and 3 under influence of wave rotor rotator 4 to expose the cells to various ports. The wave rotor rotator 4 merely applies a torque to the wave rotor 1, and may be of any variety of conventional machines capable of performing this function.

Working fluid of relatively high temperature and pressure is introduced to the wave rotor 1 through a port 5 in the end plate 2 on the left side of FIG. 2. This working fluid corresponds to region T in the wave rotor 1. Preferably, the working fluid of the region T is provided from burner 7 which merely functions to heat working fluid provided thereto. The burner 7 may be of any conventional variety.

Working fluid of relatively low temperature and pressure in region Z is compressed and forced out of the wave rotor as working fluid of region S through port 6 in the end plate 3 on the righthand side of FIG. 2, by the introduction of the working fluid of region T. The working fluid of region S thus has a relatively low temperature and high pressure. Preferably, the working fluid of region S is provided to the burner 7 which heats and reintroduces the resulting working fluid of relatively high temperature and pressure as the working fluid of region T into the wave rotor 1.

The boundary between regions S and Z containing working fluid of relatively low temperature and pressure, is a wave front or shock A' resulting from the introduction of working fluid of region T into the wave rotor 1. The interface B' between regions S and T, referred to as a contact discontinuity, reaches the right side of the wave rotor 1 just as the port 6 in the end plate 3 to the burner 7 is closed. This creates a left-running shock C' between the regions T and U which reaches the end plate 2 just as the port 5 from the burner 7 is closed. Region U is an area of the wave rotor 1 in which the working fluid is of a substantially constant, relatively high temperature and pressure.

Next, a port 8 in the end plate 3 on the right-hand side of the wave rotor 1 is opened so that working fluid of relatively high temperature and pressure in region V exits the wave rotor 1 through such port. The working fluid of region V is derived from the working fluid of region U. Preferably, the working fluid of region V is supplied to the upstream side of turbine 9, to perform useful work. The turbine 9 may be of any conventional variety.

The opening of this port 8 in the end plate 3 on the righthand side of FIG. 2 creates a left-running expansion wave having a head D' and a tail E', which reflects from a reflecting portion 10 of the end plate 2 and returns to the right-side of the wave rotor 1 to a special port 11 which has an opening which varies continually along the circumference of the end plate 3 or, in other words, which varies continually along the direction of rotation of the wave rotor 1. The special port 11 is also configured to have a first end corresponding substantially to the head D' of the expansion wave, and a second end corresponding substantially to the tail E' of the expansion wave. The special port 11 communicates with a region which has a stagnation pressure substantially equal to the pressure of region W. This feature causes cancellation of the expansion wave which would otherwise adversely affect the efficiency of the wave rotor, and possibly, render the wave rotor inoperative.

Region W above the tail E' of the expansion wave in FIG. 2 contains working fluid of relatively low temperature and intermediate pressure resulting from the release of the working fluid of region V from the wave rotor 1. A port 12 in the end plate 3 on the right side of FIG. 2 is opened such that working fluid of region X which is derived from that of region W, and which has relatively low temperature and intermediate pressure, is released through the port 12. Preferably, the released working fluid of region X is also provided to the turbine 17 to perform useful work (the turbine 17 is not necessarily the same as the turbine 9).

The release of the working fluid of region X generates another expansion wave which has a head F' and a tail G'. This expansion wave also must be cancelled to inhibit adverse affects which would otherwise decrease the efficiency of the wave rotor system, and possibly render the wave rotor system inoperative. For this purpose, a special port 13 is provided in the end plate 2 on the left side of FIG. 2. Similar to the process described above with respect to the expansion wave with the head D' and tail E', this special port 13 requires a stagnation pressure and a mass flow substantially equal to that provided by the other special port. Accordingly, the special ports may be connected by a common duct 14, as shown in FIG. 2.

Next, working fluid of region Y having relatively low temperature and pressure is introduced into the wave rotor 1 from a port 15 in the end plate 2. Preferably, the working fluid of region Y is derived from an intake of low pressure compressor 9, which may be of any conventional variety. Lastly, the port 12 releasing the working fluid of the region X is closed. This generates a left-running shock I' which brings the fluid to rest in region Z. When the shock I' reaches the end plate 2 on the left side of FIG. 2, the port introducing the working fluid of region Y into the wave rotor 1 is also closed. The working fluid of region Z derived from the working fluid of region Y is thus at a relatively low temperature and pressure corresponding to the state of the working fluid of region Z present at the beginning of the cycle.

The structure and design of the special ports 11 and 13 is of particular importance to effective operation of the wave rotor system of the present invention, and is discussed below with reference to FIGS. 2, 3A and 3B.

Figure 3A:
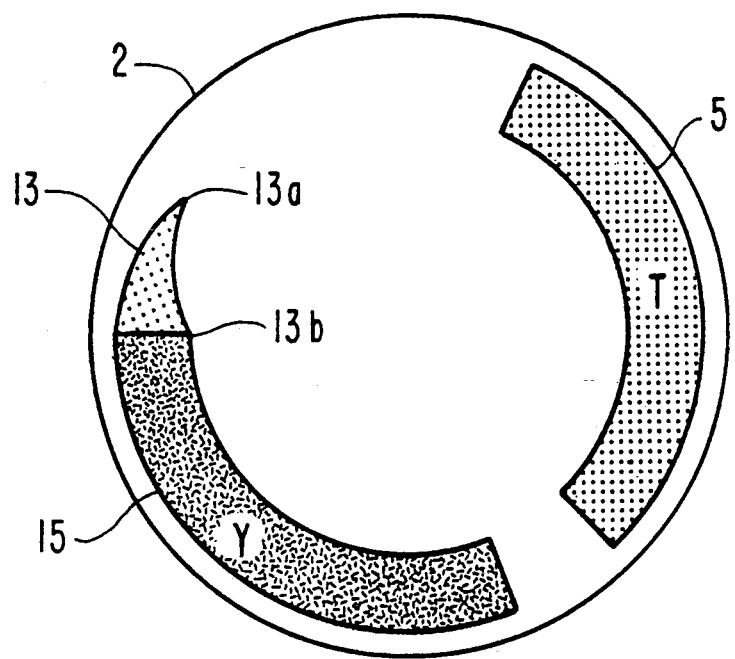
FIGS. 3A and 3B are schematic diagrams of the end plates associated with the wave rotor of the present invention.
Figure 3B:
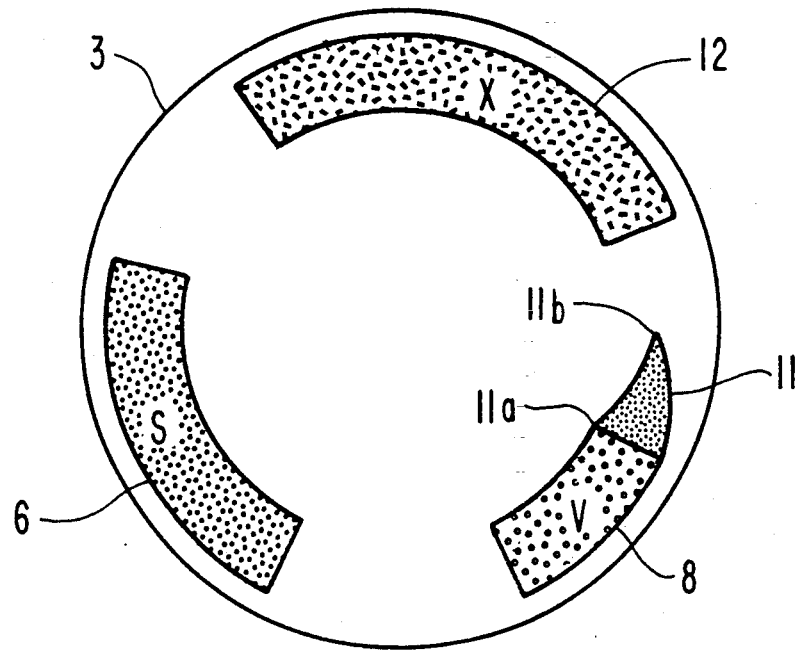

In FIGS. 3A and 3B, the end plates 2 and 3 are turned about relative to FIG. 2 such that the end plates 2 and 3 have the configuration which would be seen looking at the wave rotor system of FIG. 2 from the right side. It is assumed that the wave rotor 1 is rotating counterclockwise relative to end plates 2 and 3 in FIG. 3A and 3B.

The end plate 2 has the ports 5 and 13 formed therein which allow the working fluids of regions T and Y, respectively, to flow into the wave rotor 1. In addition, the special port 13 is formed in the end plate 2 and has a first end 13a corresponding substantially to the head F' of the expansion wave generated by the release of working fluid of region X from the wave rotor 1, and a second end 13b. As shown in FIG. 3A, the height of the special port 13 varies continually along the direction of rotation of the wave rotor 1 relative to the end plate 2.

The end plate 3 has the ports 6, 8 and 12 formed therein for allowing the working fluid of regions S, V and X, respectively, out of the wave rotor 1. Also, the special port 11 is formed in the end plate 3 and has a first end 11a corresponding substantially to the head D' of the expansion wave generated by the release of working fluid of region V from the port 6, and a second end 11b corresponding substantially to the tail E' of such expansion wave. As shown in FIG. 3B, the height of the special port 11 varies continually along the direction of rotation of the wave rotor 1 relative to the end plate 3.

Referring to FIGS. 2, 3A and 3B, the design of the special ports 11 and 13 begins with a specification of the pressure ratio across the shock A', and the state of the working fluid of region Z. This information completely determines the state S as well as the speed of the shock A', and the contact discontinuity B'. With these quantities known, it is possible to calculate the size of the port 6 associated with the region S (i.e., the time that the port 6 is open) and the mass flow out of the port 6.

As previously explained, the ports 5 and 6 preferably are coupled to the burner 7. Accordingly, the mass flow into the burner 7 must be matched with the mass flow out of the burner 7. The velocity and pressure of the working fluid in region T are already known and must be the same as the velocity and pressure of the working fluid of region S. Specification of the temperature in region T is thus made to ensure a proper mass balance. Upon obtaining the state of the working fluid of region T, the state of the working fluid of region U is also known.

The remainder of the cycle design process is iterative and proceeds as follows. A guess is made at the pressure in region Y. Since the state of the working fluid in region Z is known, specification of a pressure in region Y completely determines the state of the working fluid in region Y and the speed of the shock I'. Regions X and Y are separated by a contact discontinuity H' and therefore have the same pressure and velocity which is now known. The processes which separate the region X from the region U (i.e. the two expansion fans or waves) are isentropic. Therefore, knowing the state in region U, the pressure of region X, and that the velocity in region W is zero, the state of the fluid in regions V, W and X are completely determined.

The fluid state between the head and tail of the expansion fans (i.e., D' and E', and F' and G') may be computed using a standard method of characteristics technique. It is assumed apriori that the expansion waves are completely canceled at the special ports 11 and 13. As previously explained, the special ports 11 and 13 preferably are connected via a common duct 14. Accordingly, the mass flow to the special port 11 and the mass flow from the special port 13 are calculated. If these mass flows match, the design of the cycle is complete. If these mass flows do not match, another guess of the pressure in region Y is made and the above process is repeated until the mass flows match.

With the cycle now completed, the special port geometries may be determined. It is assumed that the common duct 14 which connects the two special ports 11 and 13 is large enough in size so that the velocity of the fluid travelling through the common duct 14 is low. Thus, the fluid in the common duct 14 can be considered to be at stagnation conditions.

Referring to the special port 11, the fluid state in the region between the head D' and the tail E' of the expansion fan (along the right side of FIG. 2) is completely known. Also known is the pressure in the common duct 14 which is coupled to the special port 11. A wave rotor cell(s) and the common duct 14 are separated by the special port 11. The width of the special port 11 is determined by the head D' and the tail E' of the expansion fan. Accordingly, the head D' corresponds to a first end of the special port 11 while the tail E' corresponds to a second end of the special port 11.

The height of the special port 11 at any point between the first and second ends 11a, 11b is determined as follows. The sudden change in height of the special port 11 can be considered to be an isentropic steady nozzle. The mass flow through this nozzle is determined by upstream conditions, which are those at the right side of the wave rotor cell at the given circumferential location between the first and second ends 11a, 11b of the end plate 3, the downstream pressure and the area of the nozzle throat height per unit depth. Since the upstream conditions are known, as is the downstream pressure and the mass flow, the height of the special port 11 along the direction of rotation of the wave rotor 1 or, in other words, along the circumference of the wave rotor 1, is completely determined. Thus, the height of the special port 11 may be determined in this fashion across the entire width of the special port 11.

For special port 13, the calculations are similar except that the flow is into the wave rotor 1. The sudden change in area is again considered to be an isentropic nozzle. However, an additional mixing loss (mixing at constant area) must be added to the equations.

For any point between the first and second ends 13a, 13b, the area is determined as follows. The upstream stagnation pressure and temperature are the known values in the common duct 14. The downstream pressure is the pressure in the wave rotor cell(s) at the given circumferential location between the first and second ends 13a, 13b. This information, along with the height of the port, completely defines the velocity in the wave rotor cell(s) communicating with the special port 13. The special port 13 has a height which is chosen such that the velocity matches the velocity which has already been calculated for that circumferential location.

Since the canceling occurring in special port 13 matches only pressures and velocities, but not densities, throughout the expansion fan, there is no guarantee as yet that the mass flow to the common duct 14 from the special port 11 matches that from the common duct 14 to special port 13. Accordingly, the matching of these mass flows is accomplished as follows. Once the expansion fan corresponding to the head F' and the tail G' has been completely canceled, special port 13 is left open at its final height until the mass flow into the wave rotor 1 balances the mass flow from the special port 11. In the cycle of FIG. 2, the material composing each cell is exposed to relatively high and relatively low temperature flows so that the time-averaged temperature to which the cell material is exposed, is lower than in a conventional turbine. Accordingly, it is expected that the present invention would be realized more readily than other proposed techniques and devices, to significantly improve the efficiency of, for example, aircraft turbofan engines.

Numerous modifications and adaptations of the present invention will be apparent to those skilled in the art and thus, it is intended by the foregoing claims to cover all modifications and adaptations which follow in the true spirit and scope of the invention and the equivalents thereof.

What is claimed is:

1. A wave rotor system provided with fluid and working fluid comprising:
    a wave rotor having cells;
    a first end plate, coupled to said wave rotor, having at least one port with dimensions which change along a circumference of said first end plate, said one port requiring a fluid of a stagnation pressure substantially equal to the stagnation pressure of the working fluid in cells communicating with the one port, and
    a second end plate, coupled to said wave rotor, having at least another port with dimensions which change along a circumference of said second end plate, said other port providing a fluid of a stagnation pressure substantially equal to the stagnation pressure of the working fluid in cells communicating with the other port.

2. A wave rotor system provided with fluid and working fluid, comprising:
    a wave rotor having cells; and
    first and second end plates coupled to said wave rotor,
    said first end plate including
        a first port for allowing working fluid of relatively high temperature and pressure to enter said wave rotor,
        a reflecting portion for reflecting a first expansion wave generated by release of the working fluid of relatively high temperature and pressure through said second end plate, the first expansion wave having a head and a tail,
        a second port having a first end substantially corresponding to the head of a second expansion wave generated by release of working fluid of relative low temperature and intermediate pressure through said second end plate and a second end substantially corresponding to the tail of the first expansion wave as determined when said wave rotor system is operating, the second port having dimensions which continually change along a circumference of said first end plate, and the second port requiring a fluid of a stagnation pressure substantially equal to the stagnation pressure of the working fluid in the cells communicating with the second port, and
        a third port for allowing working fluid of relatively low temperature and pressure into said wave rotor, and
    said second end plate including
        a fourth port for allowing working fluid of relatively low temperature and high pressure to exit said wave rotor under influence of a compression wave generated by introduction of the working fluid of relatively high temperature and pressure provided through the first port, the compression wave having a wave front corresponding to a first end of the fourth port, and a contact discontinuity generated by the compression wave corresponding to a second end of the fourth port as determined when said wave rotor system is operating,
        a fifth port for allowing working fluid of relatively high temperature and pressure to exit the wave rotor, thus generating the first expansion wave,
        a sixth port having a first end substantially corresponding to the head of the second expansion wave as determined when said wave rotor system is operating and a second end, the sixth port having dimensions which continually change along a circumference of said second end plate, and the sixth port providing a fluid of a stagnation pressure substantially equal to the stagnation pressure of the working fluid in the cells communicating with the sixth port, and
        a seventh port for allowing the working fluid of relatively low temperature and intermediate pressure to exit the wave rotor, thus generating the first expansion wave.

3. A wave rotor system as claimed in claim 2, wherein the fluids provided to the second and sixth ports have substantially identical stagnation pressures, further comprising:
    a common duct coupling the second and sixth ports.

4. A wave rotor system as claimed in claim 3, further comprising:
    a burner coupled to the first and fourth ports, for receiving and heating the working fluid of relatively low temperature and high pressure from the fourth port to generate the working fluid of relatively high pressure and high temperature provided to the first port.

5. A wave rotor system as claimed in claim 4, further comprising:
    a turbine, coupled to the fifth port, for extracting work from the working fluid of relatively high temperature and pressure provided from the fifth port.

6. A wave rotor system as claimed in claim 4, further comprising:
   a turbine, coupled to the seventh port, for extracting work from the working fluid of relatively low temperature and intermediate pressure provided from the seventh port.

7. A wave rotor system as claimed in claim 6, further comprising:
   a wave rotor rotator, coupled to the wave rotor, for rotating the wave rotor relative to said first and second end plates.

8. A wave rotor system as claimed in claim 7, further comprising:
   a low pressure compressor, coupled to the third port, for relatively lightly pressurizing working fluid to generate the working fluid of relatively low temperature and pressure provided to the third port.

9. A wave rotor system as claimed in claim 2, further comprising:
   a burner, coupled to the first and fourth ports, for receiving and heating the working fluid of relatively low temperature and high pressure from the fourth port to generate the working fluid of relatively high pressure and high temperature provided to the first port.

* * * * *